US008654129B2

(12) United States Patent
Deming

(10) Patent No.: US 8,654,129 B2
(45) Date of Patent: Feb. 18, 2014

(54) TILE BASED RENDERING OF SMOOTH POINTS USING POLYGONS

(75) Inventor: James L Deming, Madison, AL (US)

(73) Assignee: 3Dlabs Inc., Ltd., Hamilton (BM)

( * ) Notice: Subject to any disclaimer, the term of this patent is extended or adjusted under 35 U.S.C. 154(b) by 0 days.

(21) Appl. No.: 12/783,549

(22) Filed: May 19, 2010

(65) Prior Publication Data

US 2010/0225652 A1    Sep. 9, 2010

Related U.S. Application Data

(63) Continuation of application No. 10/853,325, filed on May 25, 2004, now abandoned.

(51) Int. Cl.
*G06T 11/20* (2006.01)
*G06T 15/40* (2011.01)

(52) U.S. Cl.
USPC ........... 345/442; 345/441; 345/443; 345/423; 345/428

(58) Field of Classification Search
USPC ................................................. 345/441–443
See application file for complete search history.

(56) References Cited

U.S. PATENT DOCUMENTS

| | | | | |
|---|---|---|---|---|
| 3,761,765 | A | * | 9/1973 | Machin et al. ................. 315/367 |
| 4,692,887 | A | | 9/1987 | Hashidate |
| 4,739,317 | A | | 4/1988 | Berry et al. |
| 4,835,722 | A | | 5/1989 | Clarke et al. |
| 5,237,649 | A | | 8/1993 | Yamada |
| 5,583,977 | A | * | 12/1996 | Seidl .............................. 345/619 |
| 5,588,098 | A | * | 12/1996 | Chen et al. ..................... 345/653 |
| 5,874,968 | A | * | 2/1999 | Hama ............................. 345/442 |
| 6,426,755 | B1 | | 7/2002 | Deering |
| 6,700,576 | B1 | * | 3/2004 | Lazenby et al. ............... 345/441 |
| 6,714,196 | B2 | | 3/2004 | McCormack et al. |
| 6,771,841 | B1 | * | 8/2004 | O'Rourke et al. ............. 382/288 |
| 6,781,600 | B2 | * | 8/2004 | Anwar ........................... 345/629 |
| 6,798,410 | B1 | * | 9/2004 | Redshaw et al. .............. 345/427 |
| 6,798,421 | B2 | | 9/2004 | Baldwin |
| 6,965,454 | B1 | * | 11/2005 | Silverbrook et al. .......... 358/1.9 |
| 7,075,681 | B1 | * | 7/2006 | Brothers ..................... 358/426.01 |

(Continued)

FOREIGN PATENT DOCUMENTS

| | | | | | |
|---|---|---|---|---|---|
| JP | 59211165 | A | * | 11/1984 | ............. G06F 15/20 |
| JP | 63140382 | A | * | 6/1988 | ............. G06F 15/72 |
| JP | 02186435 | A | * | 7/1990 | ............. G06F 3/153 |
| JP | 03202979 | A | * | 9/1991 | ............. G06F 15/72 |

OTHER PUBLICATIONS

Greene, Hierarchical Polygon Tiling with Coverage Masks, Proceedings of the 23rd Annual Conference on Computer Graphics and Interactive Techniques, 1998, ACM Press, pp. 65-74.*

(Continued)

*Primary Examiner* — Tize Ma
(74) *Attorney, Agent, or Firm* — Kwan & Olynick LLP

(57) ABSTRACT

An apparatus and method for rendering a smooth circular point using polygons on a computer graphics display. The circular point is approximated by a polygon and the selection of the polygon depends on the diameter of the point. The polygon is enclosed in a bounding area that is divided into a plurality of tiles. The tiles are classified into different sections depending on their location relative to the center of the point. The tiles in each section are processed according to an algorithm to generate a mask that is used to render the circular point.

14 Claims, 13 Drawing Sheets

(56) References Cited

U.S. PATENT DOCUMENTS

| | | | | |
|---|---|---|---|---|
| 7,301,539 | B2* | 11/2007 | Enloe | 345/427 |
| 2002/0113797 | A1* | 8/2002 | Potter et al. | 345/581 |
| 2004/0088158 | A1* | 5/2004 | Sheu et al. | 704/9 |

OTHER PUBLICATIONS

Foley et al., Computer Graphics: Principles and Practice, 1992, Addison-Wesley Publishing Company, Inc., pp. 660-663.*

Jack Ritter, An Efficient Bounding Sphere, 1990, Academic Press, Inc., Graphics Gems, pp. 301-303.*

English Translations of Japanese Patents: Kitano (JP 02186435 A), Honda et al. (US JP 03203979 A), Fujiwara et al. (JP 63140382 A), and Ando et al. (JP 59211165).*

Game Programming Gems 2. Charles River Media, Inc. 2001. pp. 279-286, 377-383.

Wright. Parallelization of Bresenham's line and circle algorithms. Computer Graphics and Applications, IEEE. vol. 10. Issue 5. 1990. pp. 60-67.

Optimizied Drawing of Filled and Unfilled Circles in a Two-Dimensional Graphics System. IBM Technical Disclosure. 1990. pp. 291-295.

Foley et al. Computer Graphics: Principles and Practice. Addison-Wesley Publishing Co., Inc. 1996. pp. 336-337.

Greene. Hierarchical Polygon Tiling with Coverage Masks. Proceedings of the 23rd Annual Conference on Computer Graphics and Interactive Techniques. 1998. ACM Press. p. 65-74.

Foley et al. Computer Graphics: Principles and Practice. 1997. Addison-Wesley Publishing Company, Inc. p. 660-663.

\* cited by examiner

| Entry | Value | 4 | 6 | 8 | 12 | 16 | 24 | 32 | 48 | 64 | Formula |
|---|---|---|---|---|---|---|---|---|---|---|---|
| 0 | 0.0 | X | X | X | X | X | X | X | X | X | $\sin(\pi*0/48)$ |
| 1 | 0.130523682 | - | - | - | - | - | - | - | - | X | $\sin(\pi*2/48)$ |
| 2 | 0.195087433 | - | - | - | - | - | - | X | - | X | $\sin(\pi*3/48)$ |
| 3 | 0.258815765 | - | - | - | - | - | X | - | X | X | $\sin(\pi*4/48)$ |
| 4 | 0.3826828 | - | - | - | - | X | - | X | X | X | $\sin(\pi*6/48)$ |
| 5 | 0.5 | - | X | - | X | - | X | - | X | X | $\sin(\pi*8/48)$ |
| 6 | 0.555568695 | - | - | - | - | - | - | X | - | X | $\sin(\pi*9/48)$ |
| 7 | 0.608760834 | - | - | - | - | - | X | - | X | X | $\sin(\pi*10/48)$ |
| 8 | 0.707103729 | - | - | X | - | X | - | X | X | X | $\sin(\pi*12/48)$ |
| 9 | 0.79335022 | - | - | - | - | - | X | - | X | X | $\sin(\pi*14/48)$ |
| 10 | 0.831466675 | - | - | - | - | - | - | X | - | X | $\sin(\pi*15/48)$ |
| 11 | 0.866024017 | - | X | - | X | - | X | - | X | X | $\sin(\pi*16/48)$ |
| 12 | 0.923877716 | - | - | - | - | X | - | X | X | X | $\sin(\pi*18/48)$ |
| 13 | 0.965923309 | - | - | - | - | - | X | - | X | X | $\sin(\pi*20/48)$ |
| 14 | 0.980781555 | - | - | - | - | - | - | X | - | X | $\sin(\pi*21/48)$ |
| 15 | 0.991443634 | - | - | - | - | - | - | - | X | X | $\sin(\pi*22/48)$ |

FIG. 6B

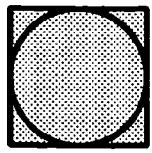
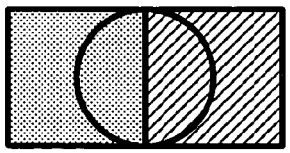
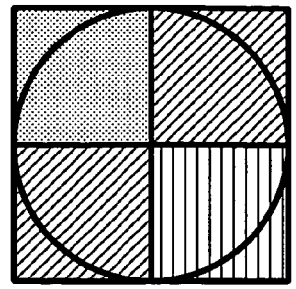
FIG. 7A   FIG. 7B
FIG. 7C
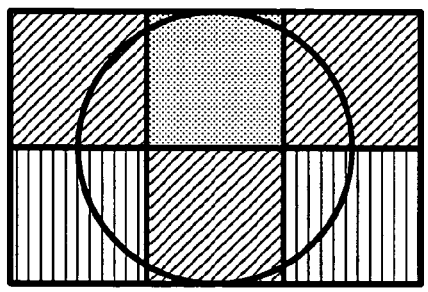
FIG. 7D
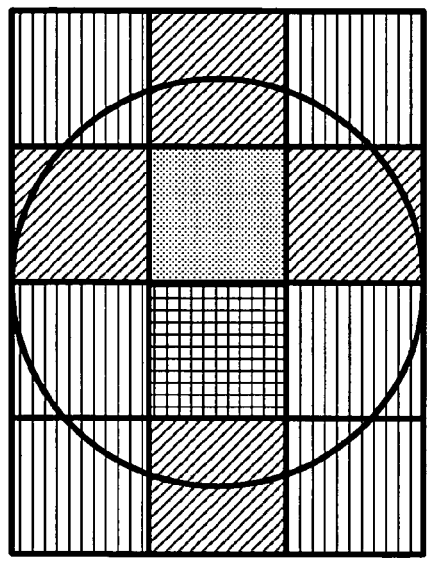
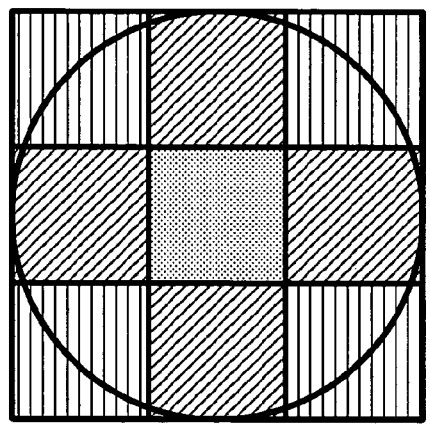
FIG. 7E
FIG. 7F
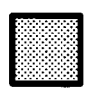 Central Section
 Vertex Section
 Corner Section
 Axial Section

TILE BASED RENDERING OF SMOOTH POINTS USING POLYGONS

BACKGROUND OF THE INVENTION

1. Field of the Invention

The present invention generally relates to computer graphics, and more specifically relates to rendering of computer images on a display screen.

2. Description of the Related Art

Many computer-generated images contain points. The points may represent vertices of polygons. They may be rain, snow, or any other particles. Illustrated on the display, or can be part of large features, such runway lights. For high quality images, the points need to appear circular. The motion of the points should be smooth, and the color of a point should be uniform.

Most graphics application program interfaces (APIs), such as OpenGL, have a method to draw points as squares. This method of rendering is usually referred to as non-smooth or non-antialiased points. The method can be used to quickly draw points. However, the rendered points are not circular on the display. Further, as the points move on the display, they jump from one pixel to the next, making them appear to shake or jitter.

To overcome the limitations of non-smooth points, most APIs define one or more techniques for drawing smooth points. These techniques require that the point have a circular shape, and that points be sampled multiple times for each pixel they touch. Sampling multiple times smoothes the edges of the point and reduces the jitter as the point moves. However, this smoothing increases the amount of processing required to draw each point.

Several methods are used to draw smooth points. One method computes the sum of squares per sample. In this method, a sample that is inside a point meets the following condition:

$$r^2 >= (x-x_p)^2 + (y-y_p)^2,$$

where:
r=the radius of the point,
$(x_p, y_p)$=the position of the center of the point,
(x, y)=the position of the sample.

Each sample evaluation requires two subtracts, two multiplies, one add, and one magnitude compare. Further, the equation is not linear, making an iterative evaluation more difficult. It should be noted that while triangle edge evaluation is a common operation in graphics system, this equation is not of the form used to evaluate triangle edges, so additional hardware is required.

Another method to draw smooth points approximates points using polygons. A circular point can be approximated with a polygon. Adding more sides to the polygon makes the approximation more accurate. Each sample point inside the bounding box of the point needs to be checked to see if it is inside the polygon. This requires an edge evaluation of the form:

$$(x-x_{n0})*(y_{n1}-y_{n0})-(y-y_{n0})*(x_{n1}-x_{n0}) >= 0;$$

where:
$(x_{n0}, y_{n0})$ and $(x_{n1}, y_{n1})$ are the endpoints of the nth edge of the polygon,
(x, y) is the position of the sample point.

This equation is of the form used to evaluate triangle edges. Most graphics hardware supports three or four edge evaluators to handle triangles or quadrangles. Larger points need more than four sides in the polygon to reduce visual artifacts, and therefore, additional hardware or processing is required to evaluate the polygons.

A third method to draw smooth points approximates points using tesselated polygons. The polygon used to approximate a circular point can be divided in to small polygons. The process is called tessellation. Typically, polygons are divided in to triangles. However, using triangles is inefficient, and can cause visual artifacts. A triangle may have as many as two edges that are interior to the polygon. All edges are evaluated, but the interior edges do not determine the final coverage. In addition, each interior edge is common to two triangles and is wastefully evaluated twice.

A pixel's final value for rendering is the sum of the coverage of all triangles that touch it. A pixel may have multiple triangles from the polygon that touch it. Inaccuracies in the math used to sum the coverage of the triangles may result in a value that is too high or too low. In addition, the application may select a different blend function, resulting in incorrect pixel values.

In the prior art method of FIG. 1, each triangle 102 has two interior edges 104. Each interior edge 106 is common to two triangles. If each triangle 102 is processed individually, then each of the interior edges 104 is evaluated twice. However, the coverage for the polygon 108 is determined only by the exterior edges 110. Some pixels are intersected by more than one triangle 102. The center most pixel is intersected by eight triangles 102, but no exterior edges 110. If each triangle 102 is processed individually, then the center pixel will be written eight times. Each time the center pixel is written, the intensity will be $\frac{1}{8}^{th}$ the intensity of the point. If pixel's colors are stored as 8 bit values, and the desired value of the point is 124, then the center pixel will have a value of 8*int(124/8)=120, or 8*int(124/8+½)=128, depending the implementation.

As shown above, the existing methods either require additional hardware for rendering points or present inconsistent results.

SUMMARY OF THE INVENTION

In one aspect, the invention is a method for rendering a circular point on a display device, wherein the circular point has a center, radius and a circumference and locating within a bounding area. The method includes selecting a polygon representing the circular point from a predefined set of polygons, determining vertices of the polygon, dividing the bounding area into one or more tiles, classifying at least one tile of the one or more sections according to the center and the radius of the circular point, wherein the at least one tile is classified into one or more predetermined sections, generating a mask for the at least one tile according to a section of the at least one tile, and rendering the circular point according to the mask.

In this method the step of selecting a polygon may further include the step of selecting an entry from a polygon table according to the radius of the circular point. The step of determining vertices may include the step of selecting vertices from a vertex table. The step of generating a mask may include the steps of determining an edge that connect two vertices and touch the at least one tile, determining whether a point in the at least one tile is inside the polygon based on a position of the point relative to the edge, and representing the point in the mask.

In another aspect, the invention is a method for rendering a circular point on a display device, wherein the circular point has a center, radius and a circumference. The method includes approximating the circular point by a polygon, defining a bounding area for the polygon, dividing the bounding area into one or more tiles, generating a mask for each tile, and rendering the circular point according to the mask In this method the step of approximating may include the step of selecting a polygon from a polygon table according to the radius. The step of defining a bounding area may include the step of calculating four corners based to the center and the radius of the circular point. The step of generating a mask further comprises the steps of determining vertices of the polygon, determining an edge that connect two vertices and touch at least one tile, determining whether a point in the at least one tile is inside the polygon based on a position of the point relative to the edge, and representing the point in the mask.

In yet another aspect, the invention is an apparatus for rendering a circular point on a display device, wherein the circular point is approximated by a polygon bounded by a bounding area and the polygon having an internal area and an external area within the bounding area. The apparatus includes a polygon database, a vertex database, an edge evaluator in communication with the polygon database and the vertex database, and a drawing element in communication with the edge evaluator. The edge evaluator receives polygon information from the polygon database and vertex information from the vertex database and determines whether a point in the bounding area is internal or external to the polygon. The drawing element approximates the circle by rendering every point in the bounding area depending on whether the point is in the internal area or external area of the polygon. In this apparatus the polygon database may include a plurality of entries, each entry listing a diameter and a corresponding polygon and the diameter may be measured in pixels.

In yet another aspect, the invention is a computer-readable medium on which is stored a computer program for rendering a circular point on a display device, wherein the circular point having a center, radius and a circumference and locating within a bounding area. The computer program includes instructions which, when executed by a computer, perform the steps of selecting a polygon representing the circular point from a predefined set of polygons, determining vertices of the polygon, dividing the bounding area into one or more tiles, classifying at least one tile of the one or more sections according to the center and the radius of the circular point, wherein the at least one tile is classified into one or more predetermined sections, generating a mask for the at least one tile according to a section of the at least one tile, and rendering the circular point according to the mask.

In yet another aspect, the invention is a computer-readable medium on which is stored a computer program for rendering a circular point on a display device, wherein the circular point having a center, radius and a circumference and locating within a bounding area. The computer program includes instructions which, when executed by a computer, perform the steps of approximating the circular point by a polygon, defining a bounding area for the polygon, dividing the bounding area into one or more tiles, generating a mask for each tile, and rendering the circular point according to the mask.

Other objects, features, and advantages of the present invention will become apparent after review of the hereinafter set forth Brief Description of the Drawing, Detailed Description of the Invention, and the Claims.

BRIEF DESCRIPTION OF THE DRAWINGS

FIG. 6B illustrates a vertex lookup table.

FIGS. 7A-7F illustrate examples of circular points and their bounding boxes.

DETAIL DESCRIPTION OF THE INVENTION

In this description, like numerals refer to like elements throughout the several views. To efficiently and accurately render a polygonal approximation of a circular point, the screen can be divided in to tiles. Each tile is typically a square or rectangle of W times H pixels, where W is the width of the tile, and H is the height. The width and height are usually, but not necessarily equal. When a point is drawn, the polygon that represents it is divided in to sections along tile boundaries. The number and size of the sections depend on the size and placement of the point.

Figure 1:
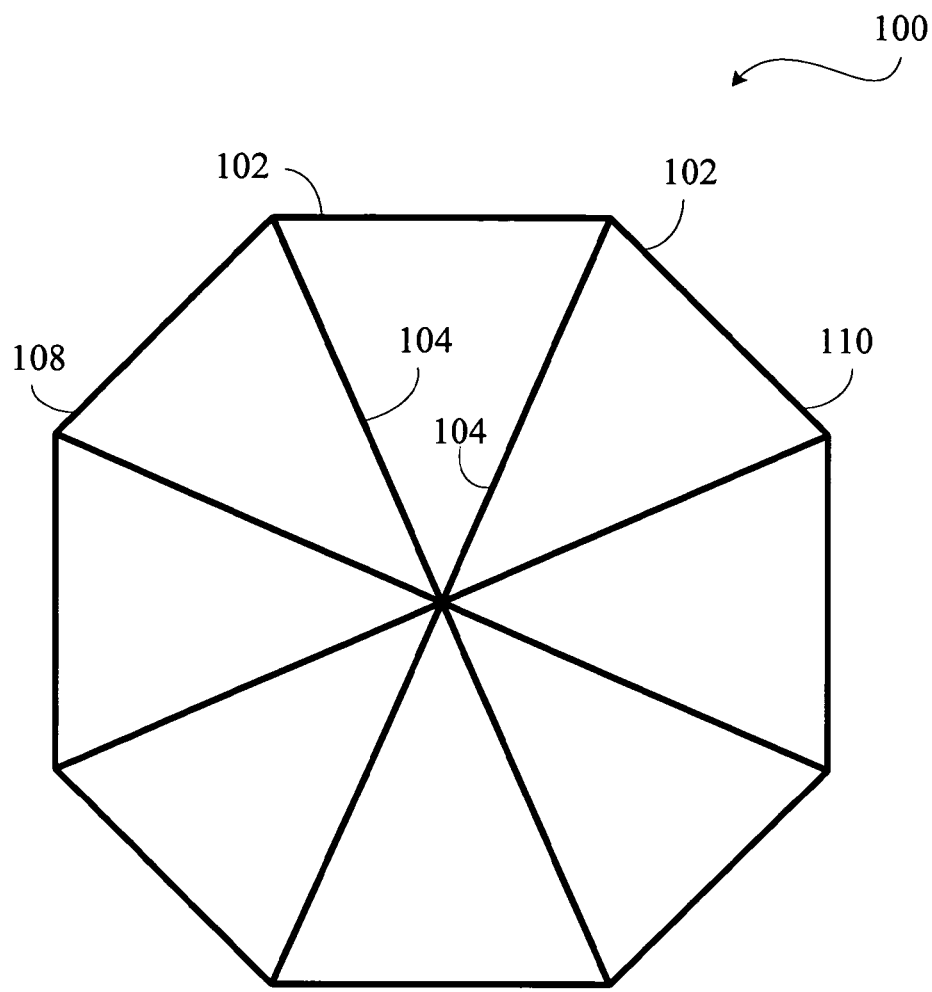
FIG. 1 depicts a prior art tessellated polygon.
Figure 2:
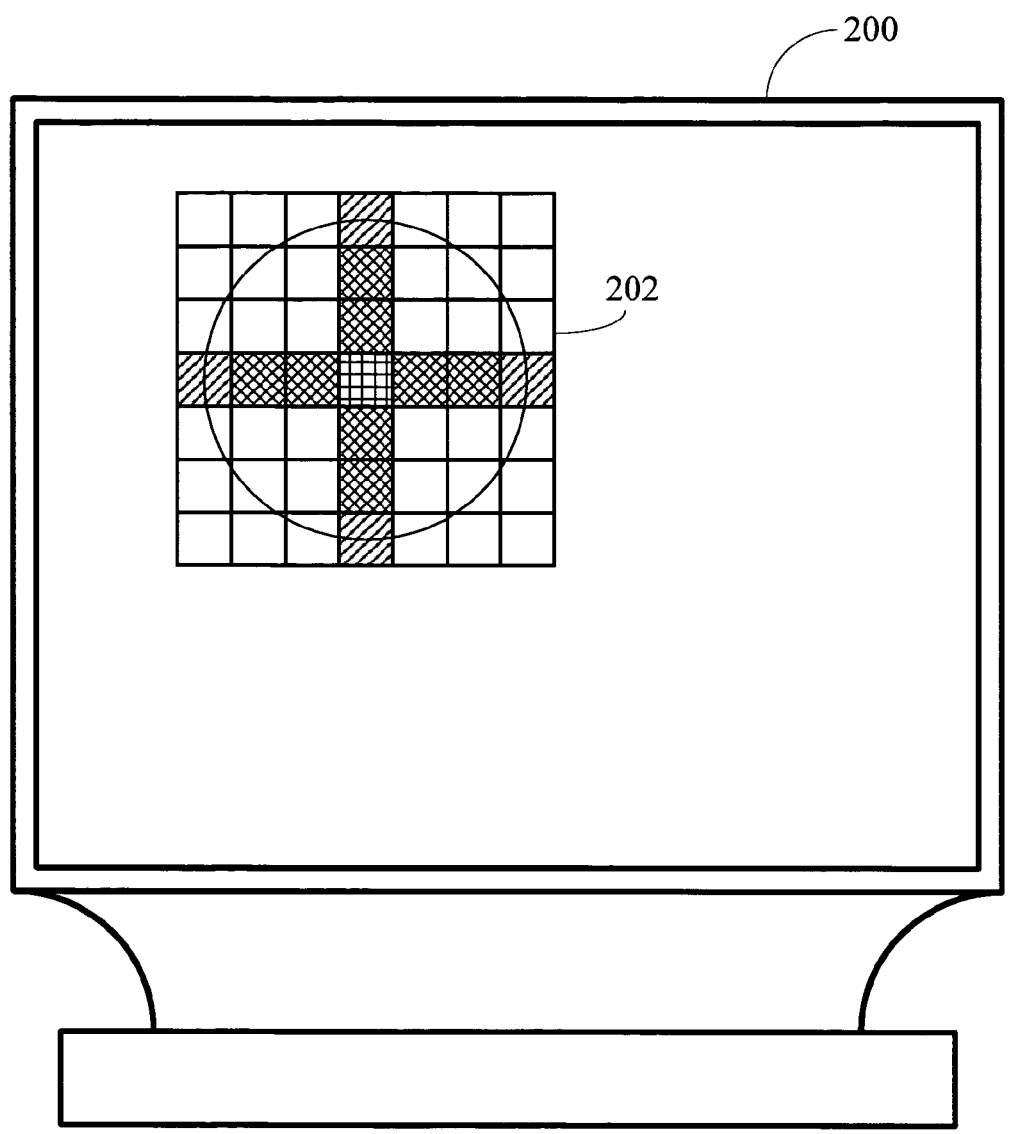
FIG. 2 depicts a computer display screen with a circular point rendered according to the invention.

FIG. 2 illustrates a computer display device 200 with a circular point 202 rendered according to the invention. The computer display device 200 is divided into a plurality of tiles and each tile is classified into a section according to a predefined classification, which is described herein.

Figure 3:
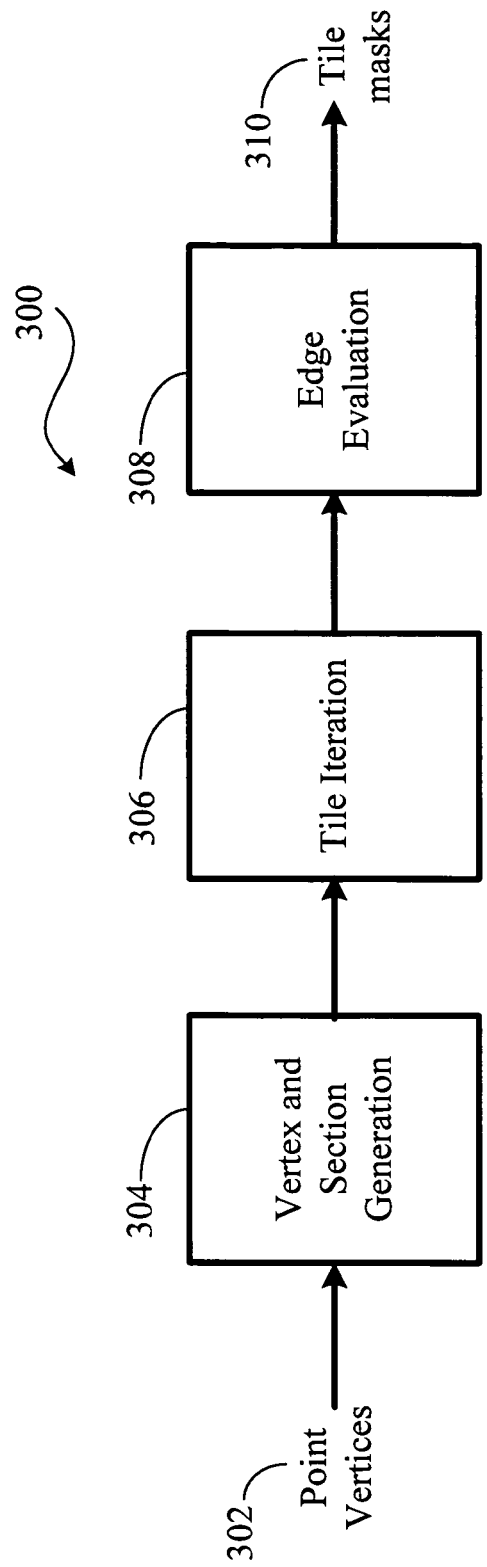
FIG. 3 depicts three main steps of an algorithm according to one embodiment of the invention.

FIG. 3 illustrates an algorithm 300 for processing each tile within a section to generate a sample mask. The sample mask indicates which samples are inside the polygon. The processing order guarantees that all edges that intersect a tile are evaluated, before processing the next tile. Once a tile has been processed, it will not be visited again by the same point.

The algorithm has three main parts. The first step 304 is to determine the vertices of the polygon, and divided it in to sections. Both operations are concurrent. The next step 306 is to iterate through each tile in each section. The final step 308 is to evaluate all the edges that intersect a tile. The results are accumulated in to a tile mask 310. The tile mask 310 is processed by the graphics pipeline to determine which pixels are lit and which color is used to light them.

Figure 4:
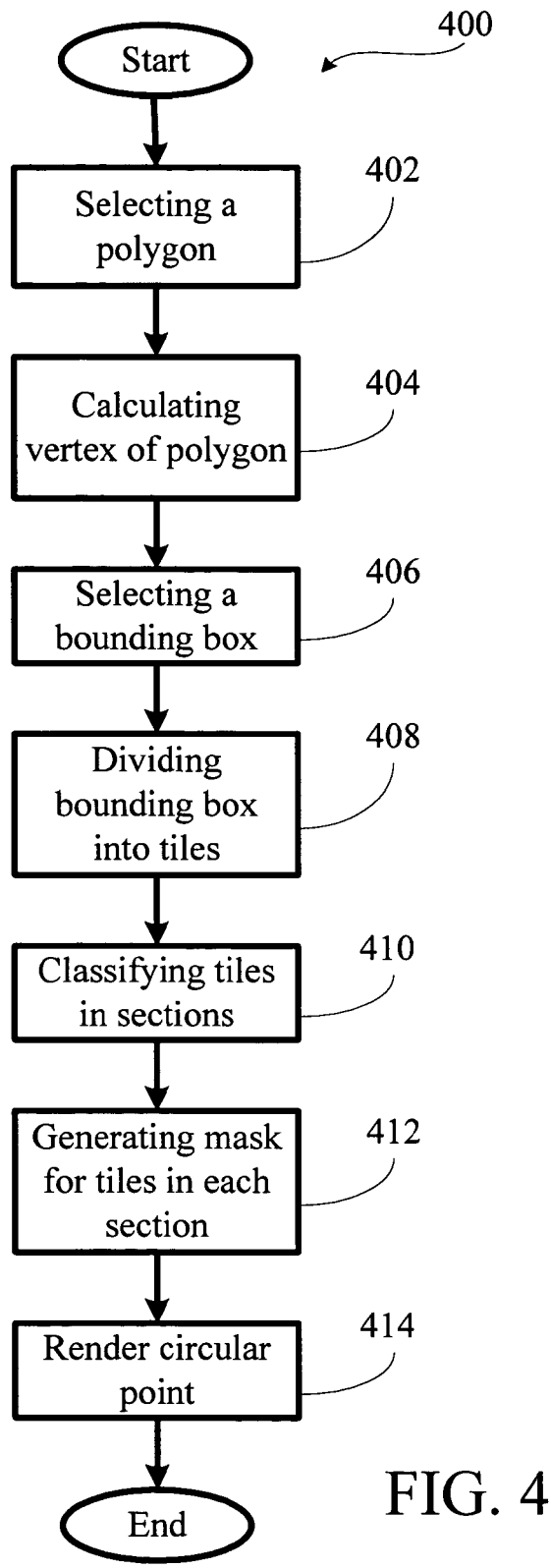
FIG. 4 is a block diagram of a method of rendering a circular point according to the invention.

FIG. 4 is a block diagram of a method 400 for rendering a circular point according to the invention. A polygon is selected as an approximation of the circular point, step 402. The selection of the polygon depends on the diameter of the point. The coordinates of vertices of the polygon are calculated, step 404. The coordinates of the vertices depend on the radius and center of the point. The next step is to determine a bounding box to enclose the circular point and its polygon representation, step 406. The bounding box divided into a plurality of tiles, step 408, and these tiles are classified into different sections, step 410. For tiles in each section, a mask is generated, step 412, and the mask is used to render the circular point, step 414.

Figure 5:
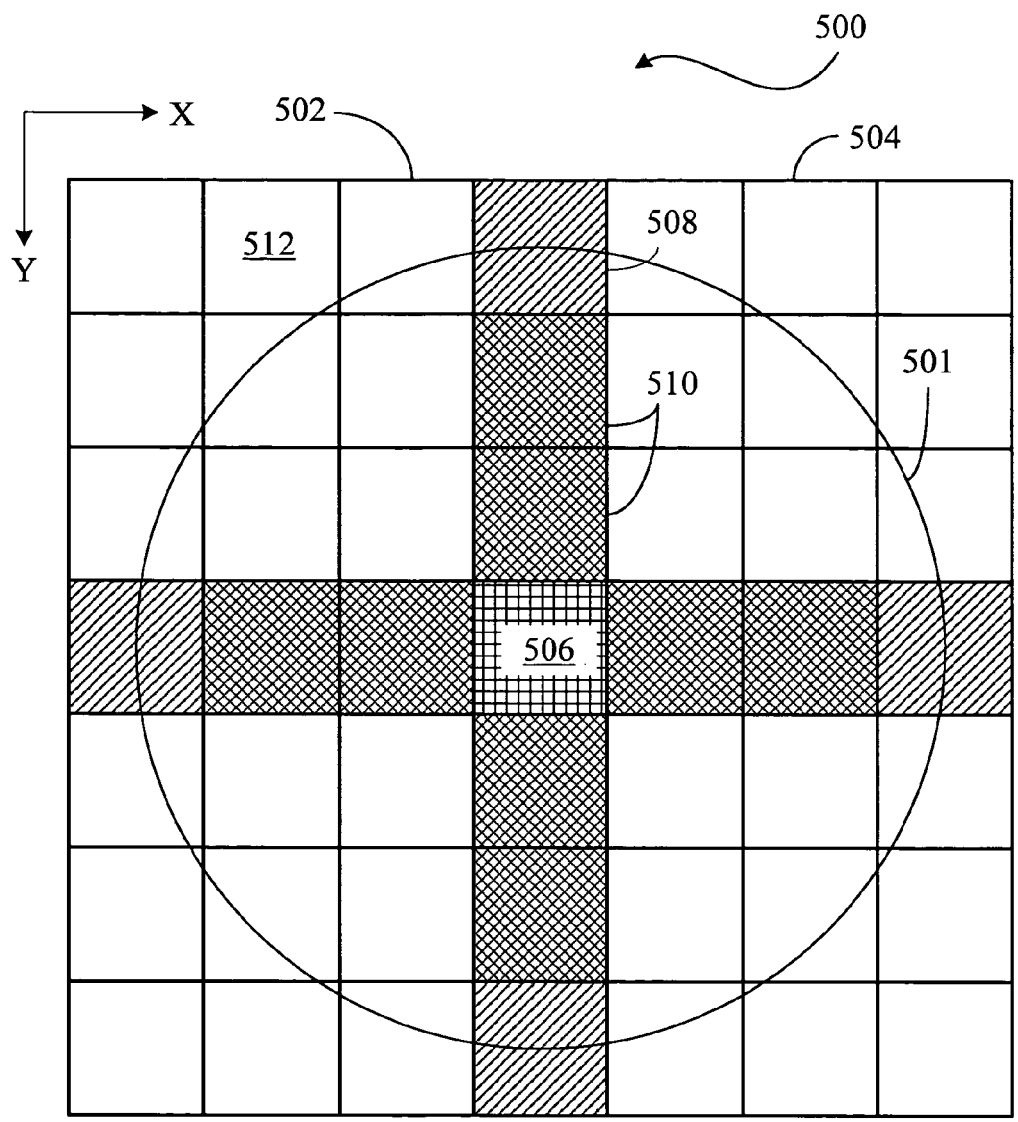
FIG. 5 depicts a circular point in a bounding box.

FIG. 5 shows an example of a circular point 501 in a bounding box 502 and the bounding box 502 is divided into 49 squares 504. Each square 504 is a tile. The squares 504 are classified into four different sections: central section 506, vertex section, axial section, and corner section. The central section 506 is where the center of the point is located. The vertex sections 508 cover the farthest portion of the point on an axial. The axial sections 510 cover tiles located between the central section and the vertex sections. The corner sections 512 cover the rest of tiles in the bounding box 502.

The first step in processing a point is to generate the polygon vertices and divide the point into sections. After the vertices are identified, the edges can be evaluated. The edge evaluation process generally has a limited number of edge evaluators. The Vertex and Section generation must not send more edges than the edge evaluation process can handle. It does this by sending packets of information that define the edges to process and a bounding box. In addition to the vertices of the edges and the bounding box, the information packets include flags that control the mask generation and identify the section being processed. In one embodiment, each information packet defines one or two edges. Multiple packets may be needed to process a section.

Figure 6A:
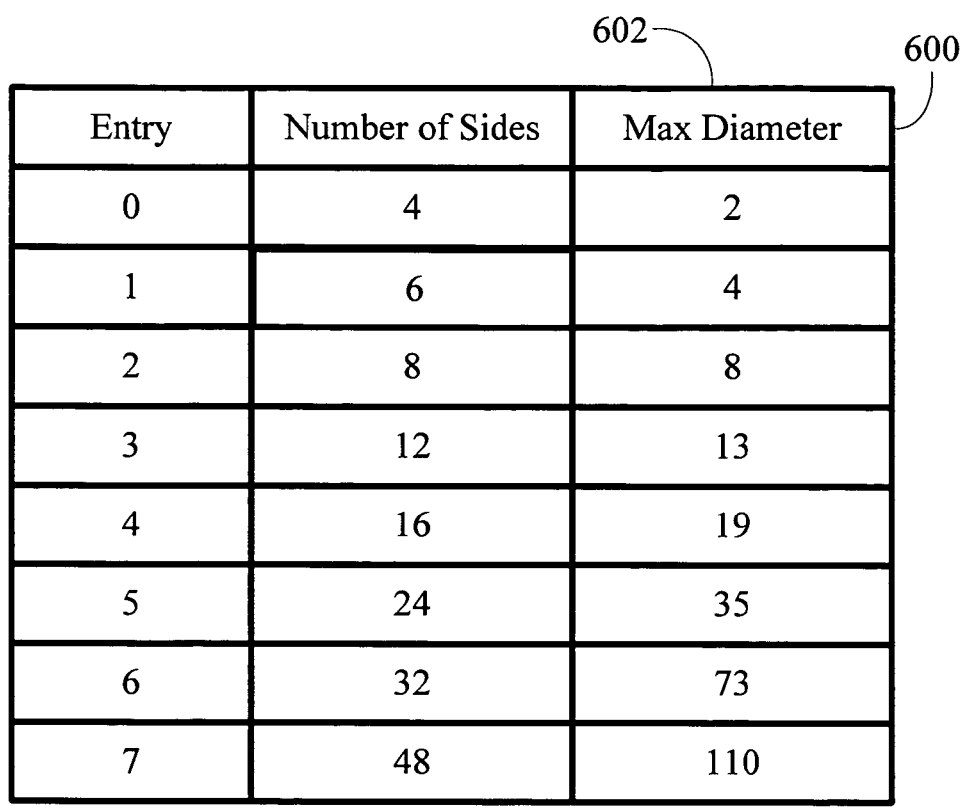
FIG. 6A illustrates a polygon selection table.

In one example, the vertices of a polygon are computed using the "Variable Stride Circle" algorithm patented by Lazenby, Jr., et al. (U.S. Pat. No. 6,700,576), the disclosure of which is incorporated hereby in its entirety. One embodiment of the invention supports 4-, 6-, 8-, 12-, 16-, 24-, 32-, 48- and 64-sided regular polygons. Generally a table as shown in FIG. 6A is used to determine which polygon to use. The polygon table 600 contains the maximum diameter (point size) 602 for each polygon. Alternatively, the polygon table 600 may contain the diameter measured in pixels. When the point size changes, the new size is compared to all the entries in the maximum diameter column 602. The polygon with the most number of sides whose table entry is greater than the new, point size is selected. The table 600 is programmable to allow trade offs between rendering speed and image quality. Generally, larger the point size, rendering speed is higher and the image quality is lower.

If the point size is set to a diameter of 6, then table entry 2 in FIG. 6A is selected (4<=6<8), and an eight-sided polygon will be used. If the point size is 17, then table entry 4 is selected (13=<17<19), and a sixteen-sided polygon will be used.

After determining the number of sizes of the polygon, the coordinates of each vertex is determined by a table look up. The vertex lookup table is implemented according to the "Variable Stride Circle" algorithm and has a plurality of entries as shown in FIG. 6B. The first column 652 is the entry number. The second column 654 is the value at that entry. The last column 656 is the formula used to compute the value. The remaining columns 658 indicate which entries are used for the polygons with the indicated number of sides. Each entry holds the coordinates of one vertex in one octant of the 32- or 48-sided polygon. By selecting which entries to use, all the supported polygons can be generated. Symmetry is used to obtain the coordinates in the other octants of the polygon. The algorithm looks up the coordinates of the current vertex and scales them by the radius of the point. The result is offset by the coordinates of the center of the point.

Although, the above description uses a table and the "Variable Stride Circle" algorithm for selecting and generating the polygonal representation of the point, other methods may be used, as long as the resulting polygon is convex.

Tiles inside the bounding box of the point are assigned to different sections as described above. Each tile may be assigned to different sections depending on the placement of the circular point. Several examples of tiles and their classification are illustrated by FIG. 7A-7F. Other examples of tiles are possible:

The size of each tile is set by user. For example, a tile size can be 8 pixels by 8 pixels, and a display area of 1024 pixels by 768 pixels would be divided into 12288 tiles. A bounding box for a circular point can be located anywhere in the display area and enclosing any number of tiles. The bounding box of a point of radius r and center located at $(c_x, c_y)$ is a square whose corners are at:

$(c_x-r, c_y-r)$, $(c_x+r, c_y-r)$, $(c_x-r, c_y+r)$, and $(c_x+r, c_y+r)$.

The four polygon vertices that lie on the center lines of the point will be at:

$(c_x-r, c_y)$, $(c_x+r, c_y)$, $(c_x, c_y-r)$, and $(c_x, c_y+r)$.

If tiles are w wide and h high, then the top-left corner of tile (n, m) is at (w*n, h*m).

After learning the coordinates of the bounding box, the tiles inside of the bounding area can be easily determined and classified by comparing the coordinates of the vertices of the bounding box and coordinates of adjacent tiles. For each tile inside the bounding box, a calculation is done to determine vertices and sections of the polygon that touch that tile. After determining the sections of the polygon, it can be easily determined if a particular pixel in the tile is inside or outside of the polygon. Finally, a mask is generated to represent the sampling of these pixels.

The following is a generation of vertices and sections for each tile of the bounding box according their classification. The central section is the tile containing the center of the circular point. If tiles are w wide and h high, then the top-left corner of tile (n, m) is at (w*n, h*m):

$(n, m) = (w*int(c_x/w), h*int(c_y/h))$.

Figure 8:
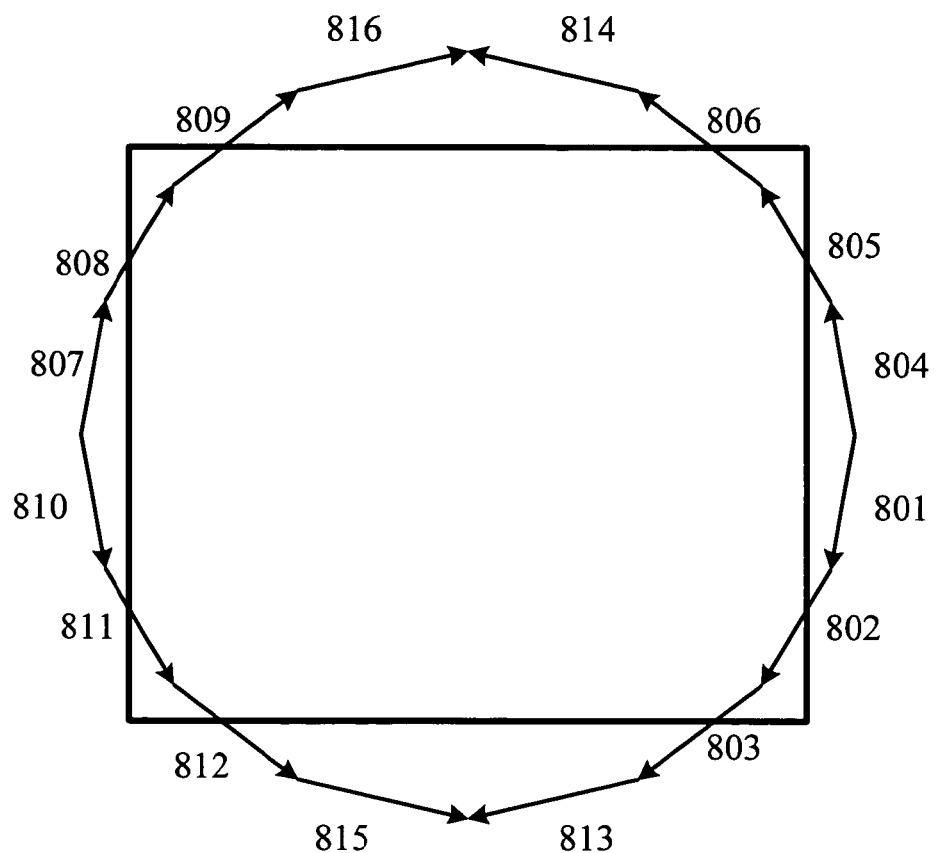
FIG. 8 depicts a rendering process for a central section.

The central section is rendered in one of two ways. If the point has one or more axial sections, it will be rendered as a tile in one of the axial sections. Otherwise, the central section is rendered by starting at the right-most vertex of the polygon and generating edges in the clock-wise direction. In FIG. 8, edge 801 is generated first, then followed by edges 802 and 803. When a vertex is reached that is below the row of tiles containing the center, or when an edge reaches or cross the center-line of the point, then the algorithm returns to the right-most vertex and reverses direction. In FIG. 8, edges 804-806 are generated sequentially. After finishing the right side of the point, the process repeats for the left side, and edges 807-809 and 810-812 are generated sequentially. Each type of section has its own bounding box rules. All bounding boxes are at tile edges. For central sections, the bounding box contains just the tile with the point center. FIG. 8 shows an example of a central section. Edges 813-816 are not generated because they are outside the tile. The numbers along the edges are the order that the edges are generated. The arrows indicate the direction of the vertex generation.

Figure 9:
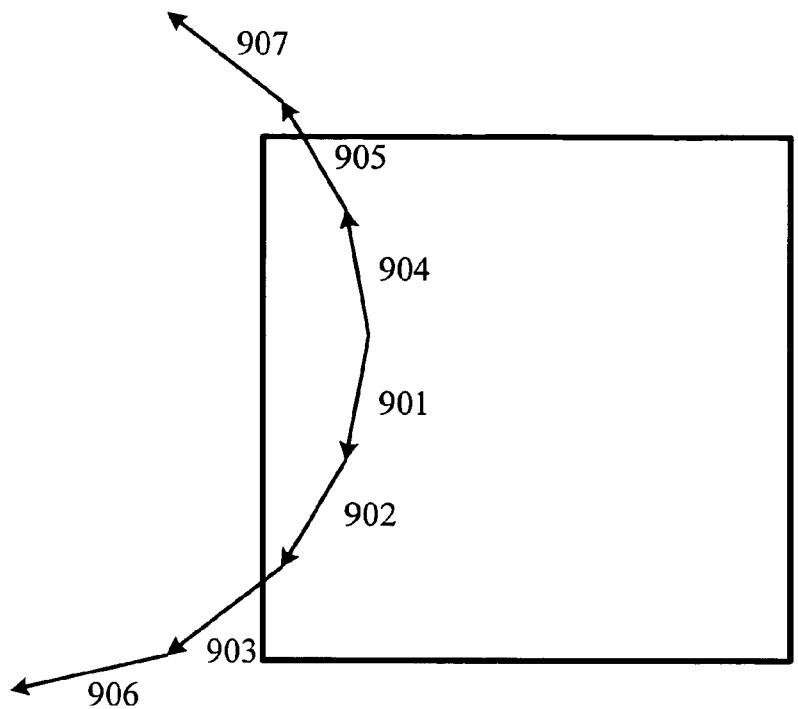
FIG. 9 depicts a rendering process for a vertex section.

FIG. 9 illustrates rendering of a vertex section. Vertex sections contain the left-most, right-most, top-most, and bottom-most vertices of the point. Only one of these vertices will be in one vertex section at any given time. Each vertex section has one and only one tile. The tiles containing these four vertices are at: $(w*int((c_x-r)/w), h*int(c_y/h))$, $(w*int((c_x+r)/w), h*int(c_y/h))$, $(w*int(c_x/w), h*int((c_y-r)/h))$, and $(w*int(c_x/w), h*int((c_y+r)/h))$. If a tile contains the center of the point, it is assigned to the central section instead of a vertex section. The calculation starts at the extreme vertex, and proceeds clock-wise. Edges 901-903 are determined first. When a vertex outside of the tile is found, vertex for edges 903, the calculation returns to the extreme vertex, and reverses direction. Each time a vertex is found outside of the tile, the vertex number of that vertex, and the coordinates of the previous vertex are saved. The saved values are used to start the adjoining sections. For vertex sections, the bounding box contains just the tile with the extreme vertex. FIG. 9 shows an example of a left of center vertex section. The state for edges 903 and 905 are saved for later use. Edge 903 enters the adjacent central section or axial section, and edge 905 enters the adjacent corner section. It is possible for either or both edges to enter either or both types of sections. Edges 906-907 are not evaluated.

Figure 10:
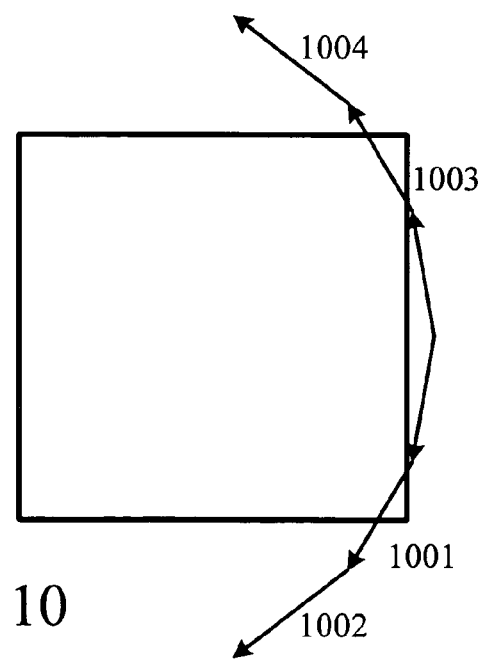
FIG. 10 depicts a rendering process for an axial section.

FIG. 10 illustrates the rendering of an axial section. Axial sections are in the row or column of tiles that contain the center. They contain one or more tiles. None of the axial sections contain the extreme vertices of the point. Those vertices are in vertex sections. If there are no tiles between a vertex section and the tile that contains the center of the point, then the circular point will not have any axial sections. Otherwise, tile that contains the center is assigned to an axial section instead of the central section, and the point will not have a central section. Tiles between $(w*int((c_x-r)/w), h*int(c_y/h))$ and $(w*int((c_x+r)/w), h*int(c_y/h))$, and tiles between $(w*int(c_x/w), h*int((c_y-r)/h))$ and $(w*int(c_x/w), h*int((c_y+r)/h))$ are in axial sections.

The saved edge states from the previous section are used as starting points for the axial section. The calculation generates edges in the clock-wise direction, and then the counter-clock-wise direction. For axial sections along the horizontal, the bounding box contains just those tiles between the tile with the point center and the tile with the extreme vertex. The tiles with the extreme vertices are never included, but the tile with the center may be included in one of the axial sections. When the last vertex for an axial section is generated, the bounding box contains all the tiles in the section. At all other times, the bounding box contains just the tile farthest from the center in that section. FIG. 10 illustrates an axial section. Edges 1001 and 1003 were saved during the processing of a previous section. Edges 1002 and 1004 will be saved for later use.

Figure 11:
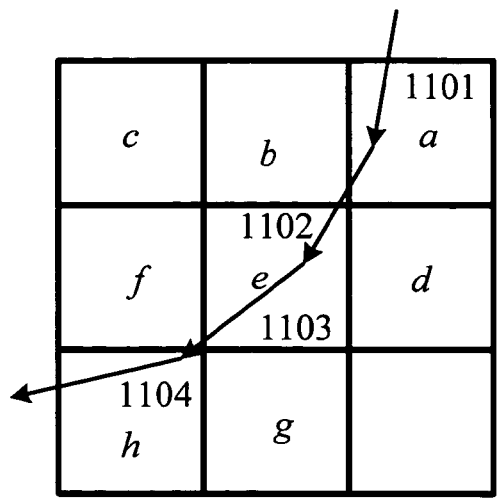
FIG. 11 depicts a rendering process for a corner section.

FIG. 11 illustrates the rendering of a corner section. Corner sections are not in the row or column of tiles that contain the center. They contain one or more tiles. None of the corner sections contains the extreme vertices or center of the point. The saved edge states from previous sections are used as starting points for the corner section. Edge generation proceeds in one direction for each section. Edge 1101 was saved during the processing of a previous section.

The bounding boxes for corner sections are dictated by the vertices in each information packet. The tile containing the first vertex defines the X and Y of the first corner of the bounding box. The tile containing the last vertex defines the Y of the second corner of the bounding box. The X coordinate of the second corner is the tile adjacent to the center column of tiles. The bounding box in corner section packet may overlap the bounding box in another corner section packet.

In the above example, the calculation requires two information packets for this corner section. The first packet sends edges 1101 and 1102. The bounding box contains tile a through f. The second packet sends edges 1103 and 1104. The bounding box contains tile e through h. The first packet processes tiles a through c in that order. Tile d is not visited since it is outside of edge 1102. Tile e is processed, but the tile mask is saved until processing can be completed. The second packet completes the processing of tile e. Then processing moves on to tile f. Tile g is not visited since it is outside of edge 1103. Tile h is the last tile processed.

When the polygon contains six sides, some special processing is needed. The polygon is oriented so that the pointed ends lie on the centerline of the point. The top and bottom are flat. The normal algorithm detects the extents of the polygon from the point's center and radius. With six side polygons, the vertices of the top and bottom edges are used to detect the vertical extents. No vertical vertex section and axial sections exist. The tiles that were in these sections are moved to the corner sections on the right side of the point if the right vertex of the top edge is in the column of tiles containing the center of the point. Otherwise, they are moved to the corner sections on the left side of the point.

Figure 12:
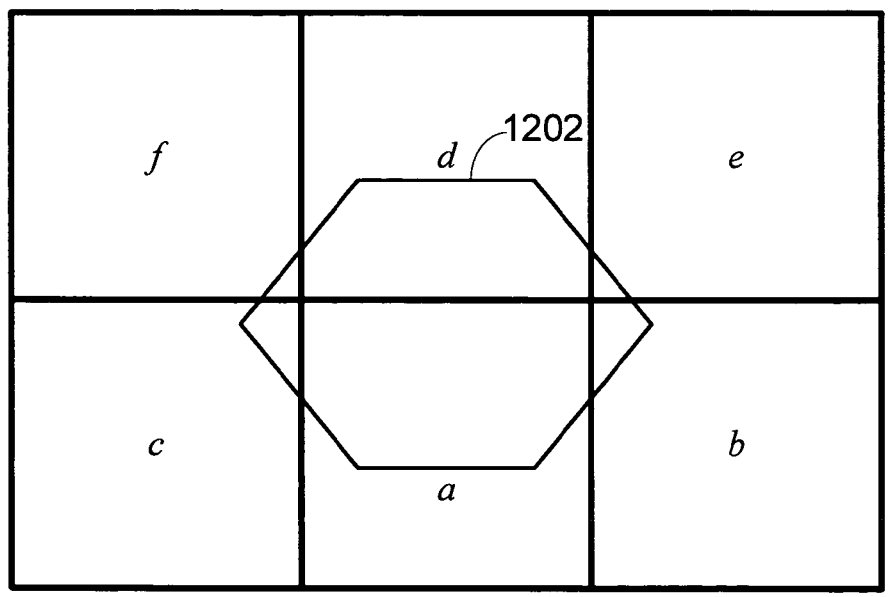
FIG. 12 depicts a rendering process for a hexagon.

In FIG. 12, the right vertex of the top edge 1202 is in the same column of tiles as the center of the point. The bounding box of the top-right corner section includes the tile in the center column. Tiles a, and b will be in one axial section. Tile c will be in another axial section. Tiles d, and e will be in one corner Section. Tile f will be in another corner section.

Figure 13:
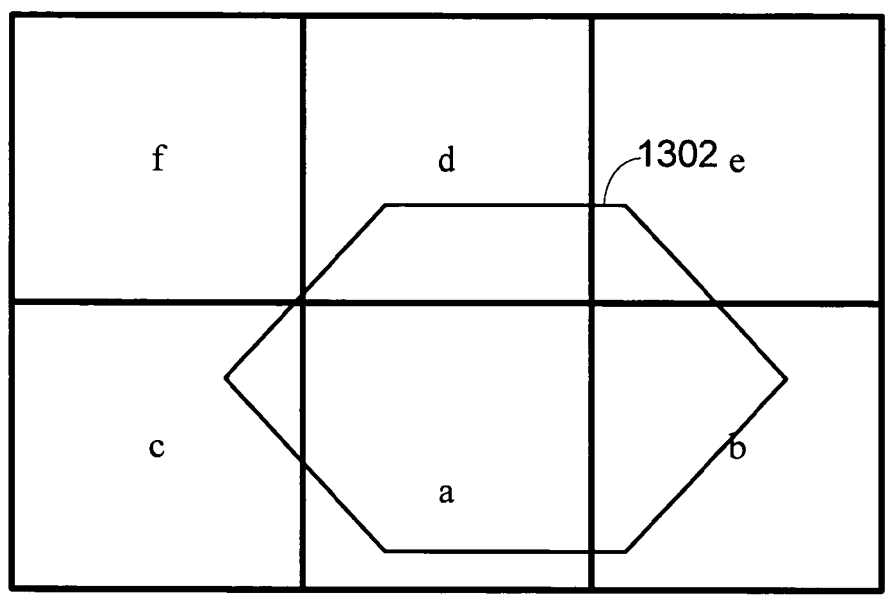
FIG. 13 depicts an alternate rendering process for a hexagon.

In FIG. 13, the right vertex of the top edge 1302 is not in the same column of tiles as the center of the point. The bounding box of the top-left corner section includes the tile in the center column. In addition, no bottom sections exist. Even though the radius extends below the center row, the bottom edge does not. Tiles a, and b will be in one axial section. Tile c will be in another axial section. Tile e will be in one corner section. Tiles d, and f will be in another corner section.

The tile iteration process receives information packets from the Vertex and Section generation process. It determines which tiles to send to the edge evaluation process. Each time it sends a tile, it also sends the edge parameters that need to be evaluated.

The order that tiles are sent is determined by which section is being processed. Central and vertex sections have one, and only one tile. That tile is the one sent to the edge evaluation. Axial sections have one or more tiles, all in one row or column. Tiles are sent starting with the one farthest from the center and working inward. Central sections have one or more tiles, in one or more rows and columns. Processing starts at the tile farthest from the center in the horizontal row nearest the center, working inward along the row. A row is complete when the tile containing the last vertex of the packet is reached, or at the edge of the bounding box. Processing then moves to the next row out from the center. The corners of each tile are evaluated to determine if the tile touches the polygon. Tiles that are completely outside the polygon are not visited.

The edge evaluation is the same process used for triangles. Each sample point in a tile is evaluated to determine if the sample point is inside the polygon. A mask is generated each time a tile is processed. The mask indicates which sample points in the tile are inside the bounding box and edges in the information packet sent by the Vertex and Section generation process. The mask may be logically ANDed with the previous mask to accumulate the final value. This allows tiles with many intersecting edges to be processed. Once all the intersecting edges of a tile are evaluated, the mask is sent on for further processing in the graphics pipeline.

The number of bits in the mask is determined by the size of the tile and the number of samples per pixel. If the sample rate is S samples per pixel, a tile of width W, and height H will have $W*H*S$ samples. The mask will have one bit for each sample in the tile.

In the context of the invention, the method may be implemented, for example, by operating portion(s) of a computing device to execute a sequence of machine-readable instructions, such as the wireless communications device or the server. The instructions can reside in various types of signal-bearing or data storage primary, secondary, or tertiary media. The media may comprise, for example, RAM (not shown) accessible by, or residing within, the components of the wireless network. Whether contained in RAM, a diskette, or other secondary storage media, the instructions may be stored on a variety of machine-readable data storage media, such as DASD storage (e.g., a conventional "hard drive" or a RAID array), magnetic tape, electronic read-only memory (e.g., ROM, EPROM, or EEPROM), flash memory cards, an optical storage device (e.g. CD-ROM, WORM, DVD, digital optical tape), paper "punch" cards, or other suitable data storage media including digital and analog transmission media.

Figure 14:
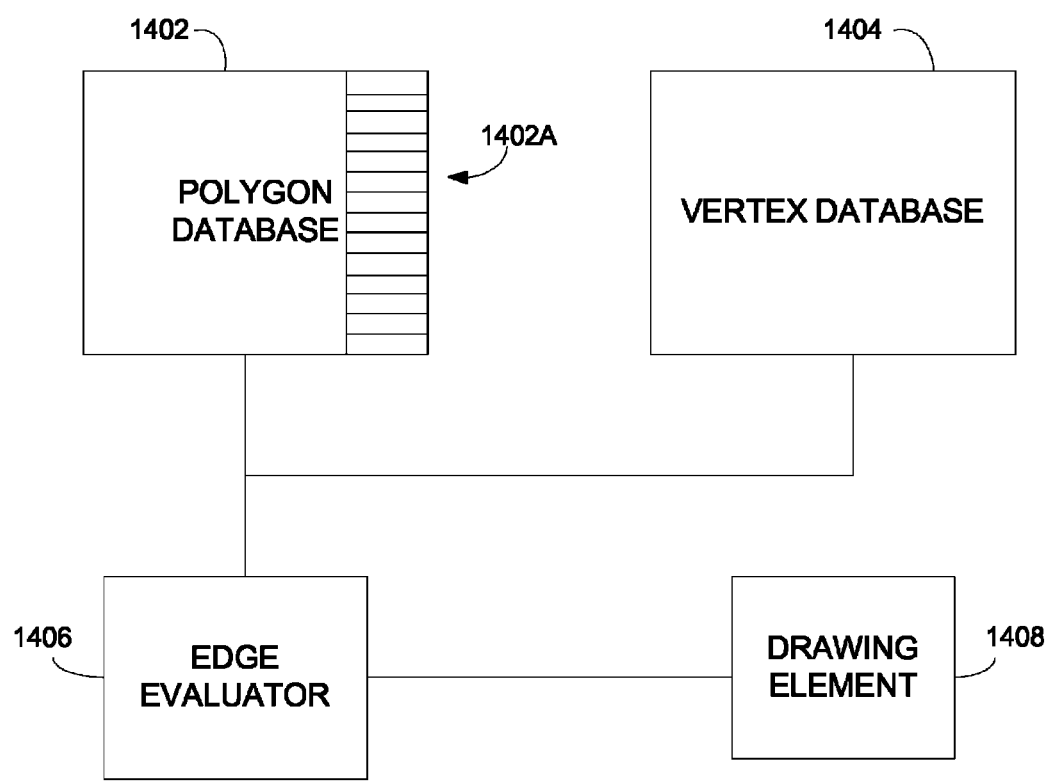
FIG. 14 depicts an apparatus for rendering a circular point on a display device.

FIG. 14 shows elements to an apparatus for rendering a circular point on a display device consistent with an embodiment of the present inventions. In this example embodiment, there is shown a polygon database 1402 with entries 1402A, said entries preferably including a diameter and a corresponding polygon. Polygon database 1402 and vertex database 1404 are in communication with edge evaluator 1406. Edge evaluator 1406 preferably receives polygon information from polygon database 1402 and vertex information from vertex database 1404 and determines whether a point in the bounding area is internal or external to the polygon. Further, there is drawing element 1408 in communication with edge evaluator 1406. Drawing element 1408 preferably approximates the circle by rendering every point in the bounding area depending on whether the point is in the internal area or external area of the polygon.

While the invention has been particularly shown and described with reference to one embodiment thereof, it will be understood by those skilled in the art that various changes in form and detail maybe made without departing from the spirit and scope of the present invention as set for the in the following claims. Furthermore, although elements of the invention may be described or claimed in the singular, the plural is contemplated unless limitation to the singular is explicitly stated.

What is claimed is:

1. A method for a computing device to render a circular point on a display device, the circular point having a center, radius and a circumference and enclosed within a bounding area having a larger circumference than the circumference of the circular point, comprising the steps of:
   selecting a polygon representing the circular point from a predefined set of polygons;
   determining vertices of the polygon;
   logically dividing the bounding area into a plurality tiles, wherein the size of each of the plurality of tiles is determined by a user, the vertices of the polygon being within the one or more tiles;
   classifying at least one of the one or more tiles of the bounding area according to the center and the radius of the circular point, wherein the at least one tile of the bounding area is classified into a predetermined section;
   generating a mask for the at least one tile of the bounding area according to the classified predetermined section of the at least one tile; and
   rendering the circular point according to the mask for the at least one tile of the bounding area.

2. The method of claim 1, wherein the step of selecting a polygon further comprises the step of selecting an entry from a polygon table according to the radius of the circular point.

3. The method of claim 1, wherein the step of determining vertices further comprises the step of selecting vertices from a vertex table.

4. The method of claim 1, wherein the step of generating a mask further comprises the steps of:
   determining an edge that connects two vertices and touches the at least one tile;
   determining whether a point in the at least one tile is inside the polygon based on a position of the point relative to the edge; and
   representing the point in the mask.

5. The method of claim 1, wherein the bounding area is a rectangular area.

6. The method of claim 1, wherein the predetermined section is selected from the group consisting of a central section, a vertex section, an axial section, and a corner section, the central section being the tile that includes the center of the circular point, the vertex section being the tile that includes the farthest axial portion of the circular point, the axial section being the tile that is located between the central section and the vertex section, the corner section being the tile that is neither classified as the central section, the vertex section, nor the axial section.

7. The method of claim 1, wherein generating the mask for the at least one tile of the bounding area is performed according to the determined vertices of the polygon.

8. A method for a computing device to render a circular point on a display device, the circular point having a center, radius and a circumference, comprising the steps of:
   approximating the circular point by a polygon;
   defining a bounding area to enclose the polygon, the circumference of the bounding area being larger than the circumference of the circular point;
   logically dividing the bounding area into a plurality of tiles, wherein the size of each of the plurality of tiles is determined by a user, the vertices of the polygon being within the one or more tiles;
   classifying each of the one or more tiles of the bounding area into a section;
   generating a mask for each of the one or more tiles of the bounding area according to its classified section; and
   rendering the circular point according to the mask for each of the one or more tiles of the bounding area.

9. The method of claim 8, wherein the step of approximating the circular point further comprises the step of selecting a polygon from a polygon table according to the radius.

10. The method of claim 8, wherein the step of defining a bounding area further comprises the step of calculating four corners based upon the center and the radius of the circular point.

11. The method of claim 8, wherein the step of generating a mask further comprises the steps of:
    determining vertices of the polygon;
    determining an edge that connects two vertices and touches at least one tile;
    determining whether a point in the at least one tile is inside the polygon based on a position of the point relative to the edge; and
    representing the point in the mask.

12. An apparatus for rendering a circular point on a display device, the circular point approximated by a polygon that is enclosed by a bounding area having a larger circumference than the circumference of the circular point, the bounding area being divided into a plurality of tiles, wherein the size of each of the plurality of tiles is determined by the user, and wherein each tile is classified into a section, the polygon having an internal area and an external area within the bounding area, comprising:
    a hardware having a polygon database;
    a hardware containing a vertex database;
    an edge evaluator in communication with the polygon database and the vertex database, the edge evaluator receiving polygon information from the polygon database and vertex information from the vertex database, identifying one or more of the plurality of tiles that are within the bounding area, and determining whether a point in the bounding area is internal or external to the polygon according to the classified section; and a drawing element in communication with the edge evaluator, the drawing element approximating the circle by rendering every point in the bounding area depending on whether the point is in the internal area or external area of the polygon.

13. The apparatus of claim 12, wherein the polygon database further comprises of a plurality of entries, each entry listing a diameter and a corresponding polygon.

14. The apparatus of claim 13, wherein the diameter is measured in pixels.

* * * * *